(12) United States Patent
Scharinger et al.

(10) Patent No.: US 6,202,538 B1
(45) Date of Patent: Mar. 20, 2001

(54) RADIAL PISTON PUMP

(75) Inventors: Klaus Scharinger, Gauchsdorf; Bernd Kolbl, Neustadt/Aisch, both of (DE)

(73) Assignee: Ina Walzlaber Schaeffler oHG (DE)

( * ) Notice: Subject to any disclaimer, the term of this patent is extended or adjusted under 35 U.S.C. 154(b) by 0 days.

(21) Appl. No.: 09/366,522

(22) Filed: Aug. 3, 1999

(30) Foreign Application Priority Data

Aug. 29, 1998 (DE) ............................................... 198 39 430

(51) Int. Cl.$^7$ ....................................................... F01B 1/00
(52) U.S. Cl. ................................................. 92/72; 384/447
(58) Field of Search ................................. 91/491; 92/72; 417/273; 384/255, 447, 569

(56) References Cited

U.S. PATENT DOCUMENTS

| 5,230,275 | * | 7/1993 | Hodge et al. | 92/72 |
| 5,344,240 | * | 9/1994 | Tatro et al. | 384/569 |
| 5,577,846 | | 11/1996 | Takahashi. | |
| 5,842,405 | * | 12/1998 | Schaefer et al. | 92/72 |

FOREIGN PATENT DOCUMENTS

| 17444/92 | * | 11/1992 | (AU) | 417/273 |
| 1453475 | | 2/1969 | (DE). | |
| 4204631 | | 10/1992 | (DE). | |
| 4238147 | | 5/1994 | (DE). | |
| 19506796 | | 10/1995 | (DE). | |
| 19704752 | | 8/1998 | (DE). | |
| 0727587 | | 8/1996 | (EP). | |

OTHER PUBLICATIONS

Peck, "Needle Roller Bearings" in Ball and Parallel Roller Bearings (Pitman Publishing 1971) pp, 9–11, TJ1071.p39, c2.*

* cited by examiner

Primary Examiner—F. Daniel Lopez
(74) Attorney, Agent, or Firm—Bierman, Muserlian and Lucas

(57) ABSTRACT

A radial piston pump comprising a rotating pump shaft (2), one portion (1) of which is connected to an eccentric ring (4) which is arranged rotationally fast thereon, said radial piston pump further comprising a needle roller bearing arranged on an outer peripheral surface of the eccentric ring (4), pump plungers (13) arranged radially of the pump shaft (2) in a star pattern in a pumping housing supported by end faces on the needle roller bearing, the bearing being configured as a self-contained, inseparable assembled unit in which the eccentric ring (4) is arranged within the needle roller bearing between rims (10, 11) of the needle roller bearing which advantageously reduces the axial design space requirement and simplifies assembly.

14 Claims, 2 Drawing Sheets

RADIAL PISTON PUMP

FIELD OF THE INVENTION

A radial piston pump comprising a rotating pump shaft, one portion of which is connected to an eccentric ring which is arranged rotationally fast thereon, said radial piston pump further comprising a needle roller bearing arranged on an outer peripheral surface of the eccentric ring, said needle roller bearing comprising a needle roller bushing and needle rollers arranged in rolling contact therewith between radially inwards directed rims of the needle roller bushing, an outer raceway for the needle rollers being formed by an inner peripheral surface of the needle roller bushing and an inner raceway for the needle rollers being formed by the outer peripheral surface of the eccentric ring, at least one pump plunger arranged in a pump housing and extending radially of the pump shaft being supported by an end face on the needle roller bushing.

BACKGROUND OF THE INVENTION

An arrangement of the said type of an eccentric of a reciprocating piston pump is known from EP 0 539 849 B1. According to FIG. 3 of this document, this prior art eccentric arrangement comprises a drive shaft having a shaft journal on which is fixed an eccentric unit which eccentric unit is made up of a bearing bushing having two radially inwards directed rims with cage-guided needle rollers arranged between these rims. The outer raceway for the needle rollers is formed by the inner peripheral surface of the bearing bushing, and the inner raceway is formed by the outer peripheral surface of an eccentric ring.

A drawback of this prior art is that the eccentric unit is held together on the one hand by the radially inwards directed rims of the bearing bushing and on the other hand, by the radially outwards directed rims of the eccentric ring.

OBJECTS OF THE INVENTION

It is an object of the invention to create an improved eccentric arrangement for a radial piston pump.

This and other objects and advantages of the invention will become obvious from the following detailed description.

SUMMARY OF THE INVENTION

The radial piston pump of the invention is comprised of a rotating pump shaft, one portion of which is connected to an eccentric ring which is arranged rotationally fast thereon, said radial piston pump further comprising a needle roller bearing arranged on an outer peripheral surface of the eccentric ring, said needle roller bearing comprising a needle roller bushing and needle rollers arranged in rolling contact therewith between radially inwards directed rims of the needle roller bushing, an outer raceway for the needle rollers being formed by an inner peripheral surface of the needle roller bushing and an inner raceway for the needle rollers being formed by the outer peripheral surface of the eccentric ring, at least one pump plunger arranged in a pump housing and extending radially of the pump shaft being supported by an end face on the needle roller bushing, wherein the needle roller bearing is configured as a self-contained, inseparable assembled unit in which the eccentric ring is arranged within the needle roller bearing between the rims of the needle roller bushing.

The invention achieves its objects by the fact that the needle roller bearing is configured as a self-contained, inseparable assembled unit in which the eccentric ring is arranged within the needle roller bearing between the two rims of the needle roller bushing. One advantage of the solution of the invention is that the eccentric ring is more economical to manufacture due to the omission of the rims thereon. On the other hand, the omission of the rims also considerably reduces the axial design space requirement and, finally, assembly of the entire eccentric unit is also simplified.

According to another feature of the invention, a stop disc is arranged on at least one side of the needle roller bushing between one of the rims of the needle roller bushing and the eccentric ring to hold the eccentric ring in the axial direction. The stop disc, in its turn, is held by the radially inwards directed rim of the needle roller bushing and assures that the eccentric ring cannot move out of the region of the needle roller bushing because the radial dimension of the stop disk is such that the stop disc extends into the region of the end face of the eccentric ring.

According to further features of the invention, the stop disc is arranged for free rotation or fixed by interference so that its outer peripheral surface either bears against the outer raceway or is arranged in a fold clearance.

According to another feature of the invention, the stop disc is made of a polymeric plastic, a non-ferrous metal or a ferrous material. The choice of the material depends on the thrust load of the pump shaft occurring in each particular case, i.e. the higher the trust load, the more stable must the stop disc be.

According to a further feature of the invention, the stop disc has a honeycomb structure for the improvement of lubrication and a consequent reduction of friction. This structured surface assures a particularly good retention of lubricant so that friction between the stop disc and adjacent parts is reduced. Further, the stop disc may also be provided with a friction-reducing coating, for example, a coating of polytetrafluorethylene (PTFE), gold or silver.

According to still another feature of the invention, the eccentric ring has a geometric profile such as a thread or a flattened portion in its reception bore for a positive locking. In this type of connection between the eccentric ring and the pump shaft, no widening of the eccentric ring takes place so that there is no negative influence on the operating clearance of the needle roller bearing.

It is further proposed to subject the eccentric ring and/or the stop disc to a hardening treatment to improve their mechanical properties.

Following a further feature of the invention, the needle roller bushing is replaced by a bushing which is closed by a bottom at its end facing away from the end portion of the pump shaft. This bottom bears against the end face of the end portion of the pump shaft and protects the bearing from pollution.

It can further be of advantage to provide a radially outwards directed projection on the eccentric ring at the folded end of the needle roller bearing. This simplifies the manufacture of the bearing assembly because the radial length of the radially inwards extending folded rim does not need to be that long.

According to an alternative solution, the invention can also achieve its objects by configuring the needle roller bearing as a self-contained, inseparable assembled unit in which the eccentric ring is arranged within the needle roller bearing between the rim and a snapped-in securing element.

In this case, the securing element is advantageously configured as a split ring. By moving the two ends of the ring towards each other, the diameter of the ring can be reduced and the ring can be inserted without any problem into an empty space in the needle roller bushing. However, it is also possible to use a continuous ring and press it together by an application of force in the direction of the bearing axis.

The invention will now be described more closely with the help of the following example of embodiment with reference to the attached drawings.

DETAILED DESCRIPTION OF THE DRAWINGS

Figure 1:
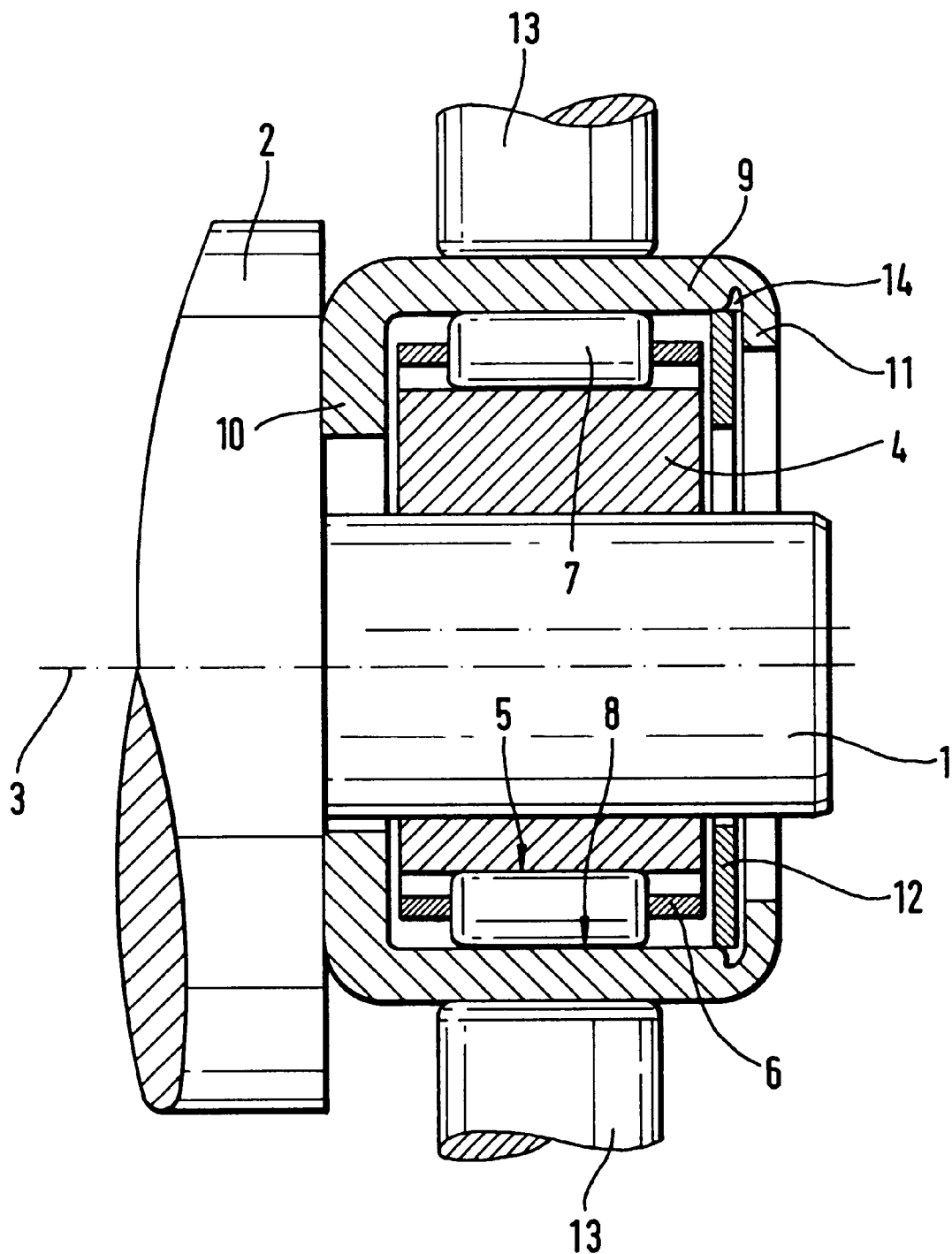
FIGS. 1, 2 and 3 each shows a longitudinal cross-section through an embodiment of the invention for an arrangement of an eccentric of a radial piston pump.

FIG. 1 shows the arrangement of the invention for an eccentric of a radial piston pump in which a pump shaft 2 having an end portion 1 rotates about a longitudinal axis 3. An eccentric ring 4 is retained on the end portion 1 of the pump shaft 2 by force or by positive engagement, and the outer peripheral surface of the eccentric ring 4 forms an inner raceway 5 for bearing needle rollers 7 which are guided in a cage 6. The associated outer raceway 8 is formed by a needle roller bushing 9 which comprises a radially inwards directed rim 10, 11 at each of its ends. The radial dimension of the left rim 10 in the FIG. 1 is such that the rim 10 partly overlaps the end face of the eccentric ring 4.

In an empty space on the right-hand side between the eccentric ring 4 and the rim 11, there is arranged a freely rotatable stop disc 12 which bears by its outer peripheral surface against an extension of the outer raceway 8. The radial dimension of the stop disc 12 is such that it partly overlaps the end face of the eccentric ring 4. The stop disc 12 is retained by the inwards directed rim 11 of the needle roller bushing 9. In this way, a compact and inseparable eccentric assembled unit with a short overall axial length is obtained which, during the rotation of the pump shaft 2, permits a reciprocating movement of the pump plungers 13 which bear against the outer peripheral surface of the needle roller bushing 9.

Figure 2:
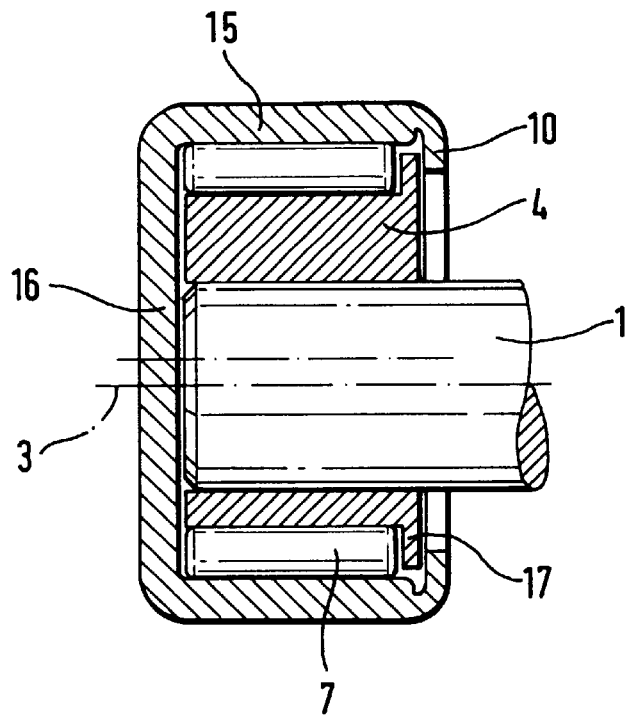

The full complement arrangement of the eccentric shown in FIG. 2 comprises a needle roller bushing 15 which is closed at one end by a bottom 16 against which the end face of the end portion 1 of the pump shaft bears. At one end, the eccentric ring 4 comprises a radially outwards directed projection 17 which is radially overlapped by the rim 10 so that an assembled unit is formed.

Figure 3:
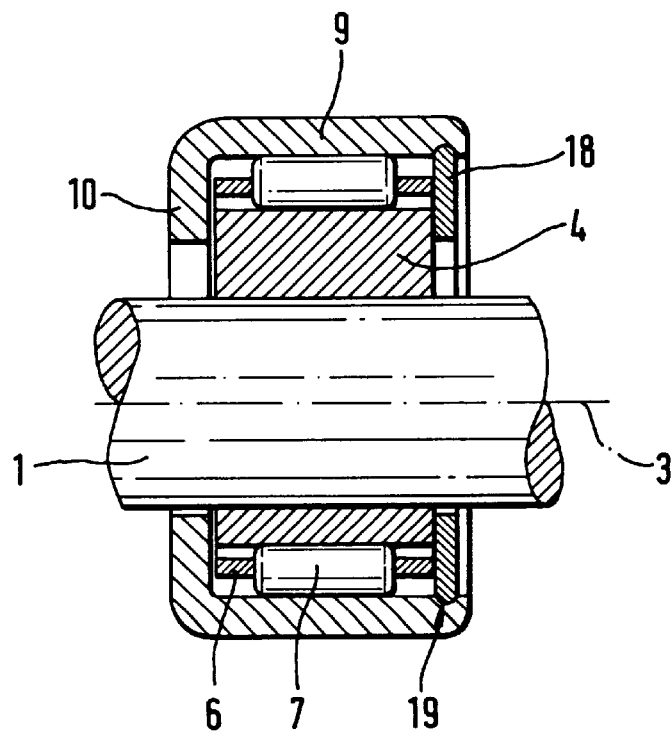

According to FIG. 3, the portion 1 is not configured as an end portion but as an intermediate portion which continues on the right and the left into the pump shaft 2. The eccentric arrangement again comprises the eccentric ring 4 and the needle roller bushing 9 having a left-hand rim 10. On the right, the needle roller bushing 9 is retained axially by a securing element 18 which is snapped into a recess 19 of the needle roller bushing 9 and overlaps the eccentric ring 4 radially.

Various modifications of the radial piston pump of the invention may be made without departing from the spirit or scope thereof and it should be understood that the invention is intended to be limited only as defined in the appended claims.

What is claimed is:

1. A radial piston pump comprising a rotating pump shaft, one portion of which is connected to an eccentric ring which is arranged rotationally fast thereon, said radial piston pump further comprising a needle roller bearing arranged on an outer peripheral surface of the eccentric ring, said needle roller bearing comprising a needle roller bushing and needle rollers arranged in rolling contact therewith between radially inwards directed rims of the needle roller bushing, an outer raceway for the needle rollers being formed by an inner peripheral surface of the needle roller bushing and an inner raceway for the needle rollers being formed by the outer peripheral surface of the eccentric ring, at least one pump plunger arranged in a pump housing and extending radially of the pump shaft being supported by an outer peripheral surface of the needle roller bushing, wherein the needle roller bearing is configured as a self-contained, inseparable assembled unit in which the eccentric ring is arranged within the needle roller bearing between the rims of the needle roller bushing.

2. A bearing of claim 1 wherein a stop disc is arranged on at least one side of the needle roller bushing between one of the rims of the needle roller bushing and the eccentric ring to hold the eccentric ring in axial direction.

3. A bearing of claim 2 wherein the stop disc is arranged for free rotation or fixed by interference.

4. A bearing of claim 2 wherein an outer peripheral surface of the stop disc bears against the outer raceway or is arranged in a fold clearance.

5. A bearing of claim 2 wherein the stop disc is made of a material selected from the group consisting of polymeric plastic, a nonferrous metal and a ferrous material.

6. A bearing of claim 2 wherein the stop disc has a honeycomb structure at least on one end face.

7. A bearing of claim 2 wherein the stop disc comprises a friction-reducing coating.

8. A bearing of claim 7 wherein the coating is selected from the group consisting of polytetrafluorethylene (PTFE), gold and silver.

9. A bearing of claim 1 wherein the eccentric ring has a geometric profile of a thread or a flattened portion in a reception bore thereof for a positive locking.

10. A bearing of claim 2 wherein at least one of the eccentric ring and the stop disc is subjected to a heat treatment.

11. A bearing of claim 1 wherein the needle roller bushing has a closed bottom at an end facing away from said one portion of said pump shaft.

12. A bearing of claim 1 wherein the eccentric ring comprises a radially outwards directed projection in a region of a folded end of the needle roller bearing.

13. A radial piston pump comprising a rotating pump shaft, one portion of which is connected to an eccentric ring which is arranged rotationally fast thereon, said radial piston pump further comprising a needle roller bearing arranged on an outer peripheral surface of the eccentric ring, said needle roller bearing comprising a needle roller bushing having a radially inwards directed rim, an outer raceway for the needle rollers being formed by an inner peripheral surface of the needle roller bushing and an inner raceway for the needle rollers being formed by the outer peripheral surface of the eccentric ring, at least one pump plunger arranged in a pump housing and extending radially of the pump shaft being supported by an end face on the needle roller bushing, wherein the needle roller bearing is configured as a self-contained, inseparable assembled unit in which the eccentric ring is arranged within the needle roller bearing between the rim of the needle roller bushing and a snapped-in securing element.

14. A bearing of claim 13 wherein the securing element is configured as a split ring.

* * * * *